United States Patent [19]

Balensiefen et al.

[11] 4,169,686
[45] Oct. 2, 1979

[54] QUICK RELEASE COUPLING FOR CONNECTION BETWEEN SHAFTS

[75] Inventors: Heinrich Balensiefen, St. Augustin; Wilhelm von Allwörden, Erbach, both of Fed. Rep. of Germany

[73] Assignee: Jean Walterscheid GmbH, Lohmar, Fed. Rep. of Germany

[21] Appl. No.: 853,905

[22] Filed: Nov. 22, 1977

[30] Foreign Application Priority Data

Dec. 4, 1976 [DE] Fed. Rep. of Germany ....... 2655074

[51] Int. Cl.$^2$ ............................................. F16D 3/32
[52] U.S. Cl. ...................................... 403/12; 403/322; 64/32 R; 64/4
[58] Field of Search ................. 403/325, 322, 359, 12, 403/11; 64/4, 6, 32 F, 32 R

[56] References Cited

U.S. PATENT DOCUMENTS

| | | | |
|---|---|---|---|
| 3,053,062 | 9/1962 | Geisthoff | 64/32 R X |
| 3,070,393 | 12/1962 | Silverberg et al. | 403/325 |
| 3,551,013 | 12/1970 | Trojanowski et al. | 64/6 X |
| 3,703,089 | 11/1972 | Geisthoff | 64/32 R |

FOREIGN PATENT DOCUMENTS

| | | | |
|---|---|---|---|
| 2537601 | 5/1976 | Fed. Rep. of Germany | 403/322 |
| 1225666 | 3/1971 | United Kingdom | 403/322 |

*Primary Examiner*—Andrew V. Kundrat
*Attorney, Agent, or Firm*—Toren, McGeady and Stanger

[57] ABSTRACT

A quick release coupling for connecting a driven shaft having a universal type joint at one end thereof, with a drive shaft, includes a coupling box surrounding the drive shaft and a coupling sleeve carried at the end of the driven shaft for axially receiving an end of the drive shaft. An annular groove is located on the drive shaft and a ball-catch mechanism is carried by the coupling sleeve for snap acting cooperative engagement with the annular groove to produce a positive form fitting engagement between the drive shaft and the coupling sleeve. A locking ring is carried for movement on the coupling sleeve between a release position and a locking position for locking the ball-catch mechanism into engagement with the groove. A spring is used to bias the locking ring into the locking position. Means are provided for engaging the locking ring to hold it in the release position during insertion and removal of the drive shaft into and out of the coupling sleeve. A release lever is pivotally mounted on the coupling box for engaging the locking ring to move it into a release position allowing the ball-catch mechanism to be released from the annular groove so that the shafts may be easily disconnected.

6 Claims, 6 Drawing Figures

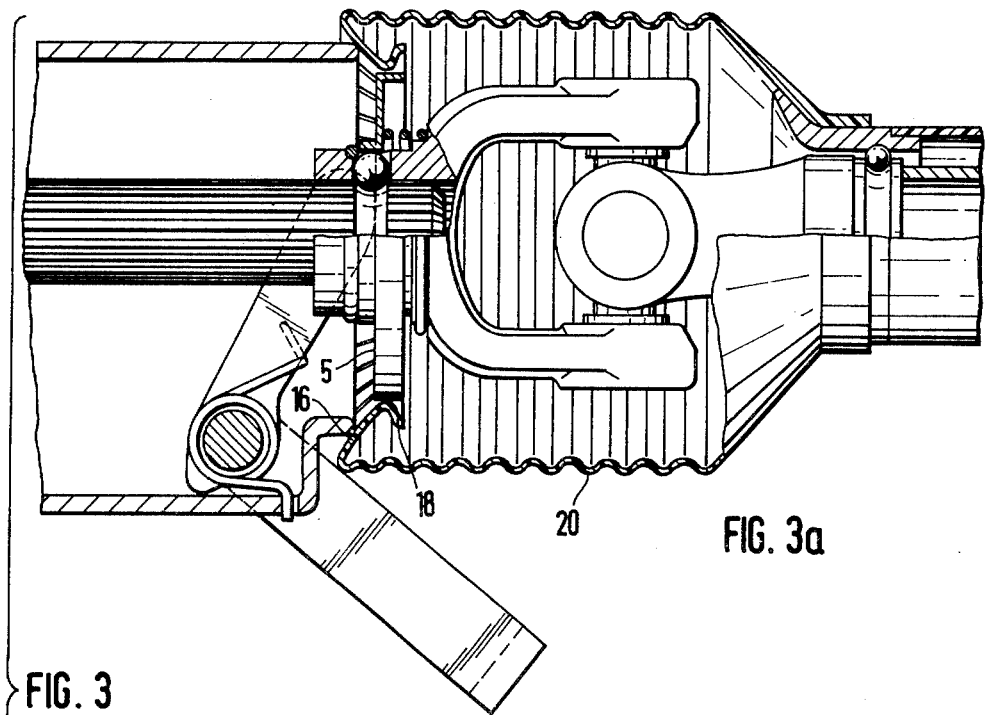
FIG. 3a
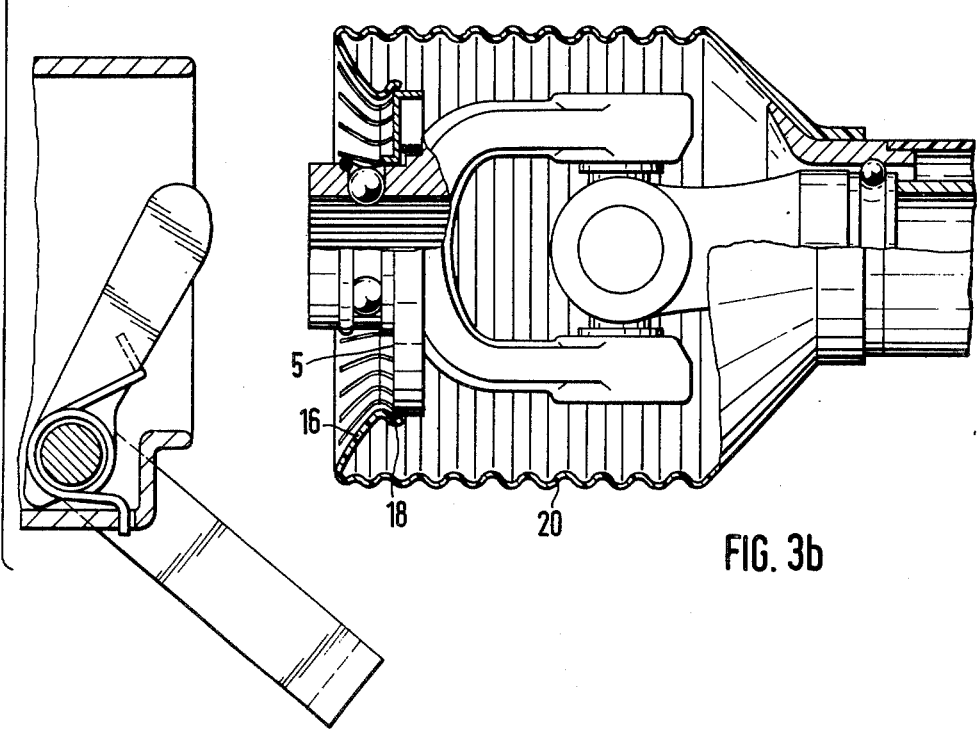
FIG. 3b
FIG. 3

QUICK RELEASE COUPLING FOR CONNECTION BETWEEN SHAFTS

BACKGROUND OF THE INVENTION

The present invention relates to a coupling for axially connecting a drive shaft with a driven shaft, and more particularly relates to such a coupling of the quick release type for connecting a driven cardanshaft of a piece of agricultural equipment and an output shaft of a farm tractor. The coupling of the present invention is of the type including a coupling sleeve with a ball-catch mechanism to provide locking engagement between the cardanshaft and the drive shaft, and a release lever mounted on a coupling box surrounding the drive shaft for engaging and releasing the ball-catch mechanism to allow easy disconnect between the drive shaft and the driven cardanshaft.

Quick release couplings in which a cardanshaft is directly coupled to a power output shaft of a tractor are known, such as shown in German PS Pat. No. 1 600 225. In this earlier arrangement, a frustoconical member having externally carried teeth is fitted onto the output shaft and is secured thereon by an elastic pin having a spherical head which is adapted to engage with an annular groove on the output shaft. A mating conical sleeve having internal teeth is then pushed over the frustoconical member and secured by claw or clutch elements.

The drawback of this type of conventional arrangement is that the connection between the frustoconical member and the output shaft is not a positive one and is purely dynamic. It has been found that this type of connection is insufficient in that the frustoconical member frequently falls or jumps off the end of the output shaft.

Another prior proposal is shown in German PS Pat. No. 2 537 601 which has a coupling hub fitted onto the power output shaft and is secured thereon by a ball-catch mechanism. A coupling sleeve is then pushed over the hub and is also secured on the shaft by a ball-catch mechanism. Both of the ball-catch mechanisms are radially maintained in operatively locking position by a securing ring to provide a form fitting positive connection between the various members. This is an improvement over the prior coupling mechanism in that the coupling cannot be accidentally disengaged, however, this device is relatively complicated and expensive. In addition, tools are required to disengage the coupling hub from the output shaft.

It is accordingly a principal object of the present invention to provide a quick release coupling which can fit directly onto an end of the drive shaft and be securely held thereon by a positive form fitting connection. It is also an object of the invention to provide means for quickly releasing the coupling without the use of tools by providing a release lever which can be operated from the outside of the coupling.

Other objects, features and advantages of the present invention will become more apparent from the description of the invention in connection with the accompanying drawings to be described more fully hereinafter.

SUMMARY OF THE INVENTION

The foregoing objects are accomplished by providing a coupling box surrounding the drive shaft, a coupling sleeve carried at an end of the driven cardanshaft for axially receiving therein an end of the drive shaft, an annular groove located on the drive shaft, a ball-catch mechanism carried by the coupling sleeve for snap acting cooperative engagement with the annular groove, a locking ring carried for movement on the coupling sleeve between a release position and a locking position for locking the ball-catch mechanism into engagement with the annular groove for positive form fitting connection with the drive shaft, biasing means for urging the locking ring into the locking position, means for engaging the locking ring to hold it into the release position, and a release lever pivotally mounted on the coupling box for engaging the locking ring to move it from the locking position to the release position to allow easy disconnect between the drive and driven shafts. In one embodiment, a plurality of resilient retaining straps are evenly spaced about the inner circumferential wall of the coupling box. An annular release face is formed on the locking ring having an outside diameter greater than the diameter of a circle formed by points tangent with the inside surfaces of the retaining straps so that the locking ring is held in the release position by the retaining straps during insertion and removal of the drive shaft with the coupling sleeve.

The advantage of this arrangement is that the coupling sleeve is directly locked onto the end of the output drive shaft of the farm tractor. As a result, there are no loose or separate accessories, such as adaptors, which may become misplaced when not in use.

Additionally, no tools are required to engage the coupling, the coupling sleeve being simply pushed manually axially onto the end of the output drive shaft. The ball-catch mechanism automatically locks onto the shaft by balls carried on the ball-catch mechanism being positively held in the annular groove by the locking ring.

The coupling is easily disengaged by pivotal movement of the release lever. This will cause movement of the locking ring to a release position thus releasing the ball-catch mechanism. Further pivotal movement of the release lever will push the coupling sleeve completely off the end of the output drive shaft.

A further feature of the invention is to provide an inwardly directed elastic skirt on the open end of a funnel guard surrounding the universal joint at an end of the cardanshaft. The elastic skirt is provided with a plurality of radial slits, and a trip edge extends circumferentially about the inner edge of the skirt being adapted to engage the release face on the locking ring to hold the locking ring in the release position. The skirt is also adapted to slide onto and about the outer circumferential wall of the coupling box when the drive shaft is received in the coupling sleeve.

The advantage of this arrangement is that the locking ring is actually retained in the release position by the funnel guard itself which is part of the cardanshaft. Accordingly, the cardanshaft having this arrangement may be coupled with the output drive shaft of any tractor without requiring additional retaining brackets or similar members in or on the coupling box of the drive shaft.

BRIEF DESCRIPTION OF THE DRAWINGS

Various embodiments of the invention will be more particularly described in connection with the accompanying drawings, in which:

FIG. 3 is a view similar to that of FIG. 1 showing the locking ring being retained in the release position by the trip edge on the elastic skirt provided on the funnel guard.

DESCRIPTION OF THE INVENTION

Figure 1:
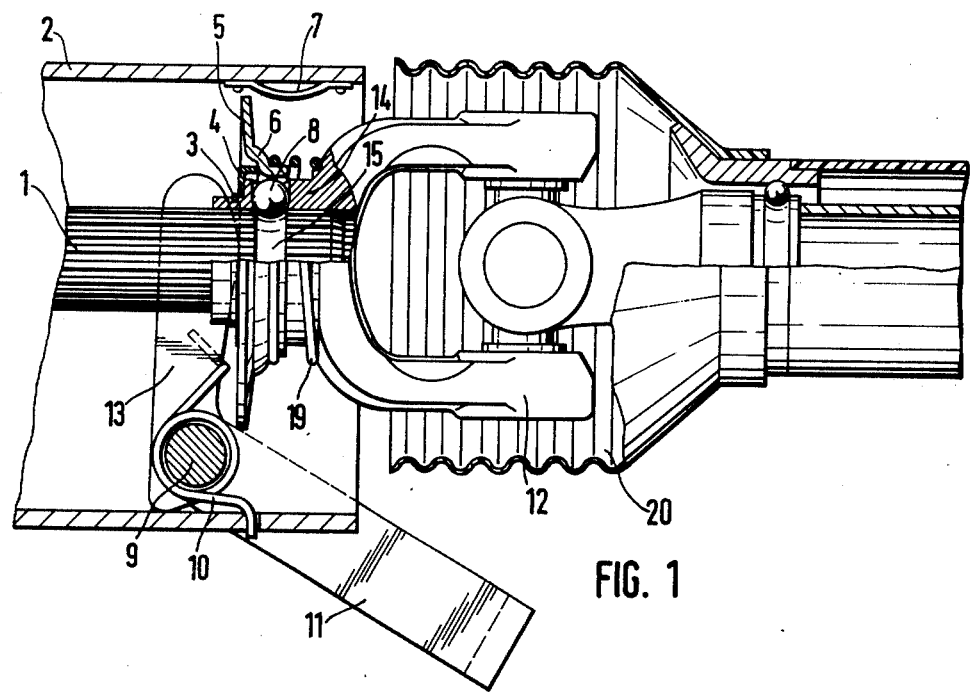
FIG. 1 is a partial sectional view of a coupling between a cardanshaft and a power output shaft of a tractor in accordance with the present invention.
Figure 2:
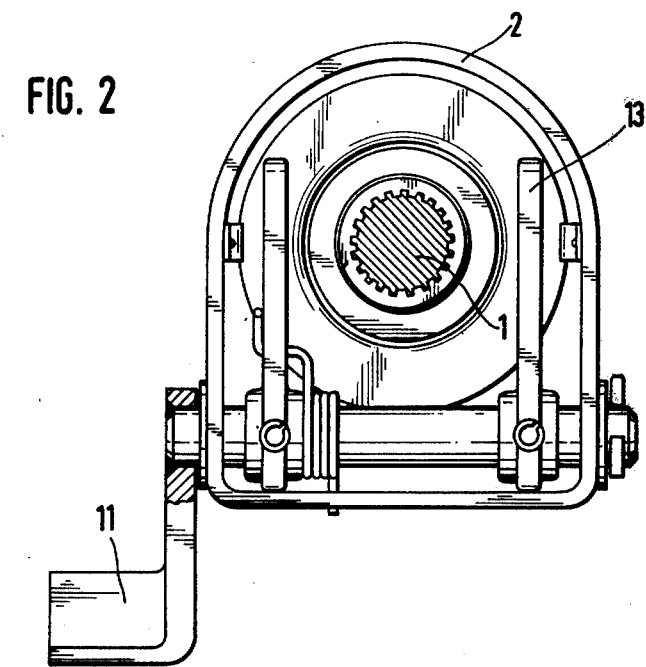
FIG. 2 is a plan view of the coupling directed toward the drive shaft and showing the release lever and a pair of retaining straps.
Figure 4:
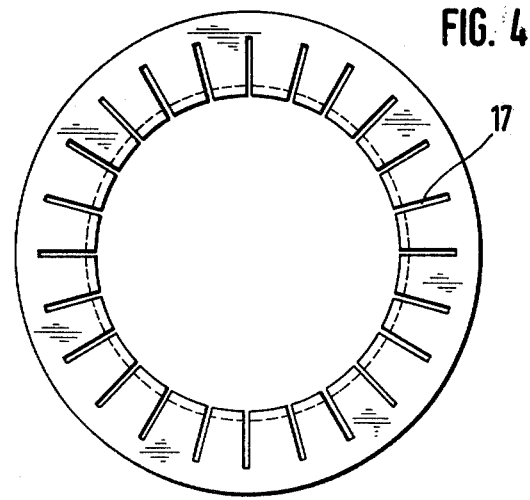
FIG. 4 is a plan view of the elastic skirt having a plurality of slits.

Referring now in more detail to the accompanying drawings, FIG. 1 illustrates the arrangement according to the present invention for coupling a drive shaft 1 taken off the power output of a tractor with a cardanshaft, such as for driving an agricultural implement, having a universal type joint at one end of the shaft which has an outer yoke 12. A coupling sleee 14 is formed integral with the outer yoke 12 at an end of the cardanshaft for receiving a free end of the drive shaft 1. A ball-catch mechanism, to be described more fully hereinafter, is carried on the coupling sleeve 14 for securely connecting the end of shaft 1 with the sleeve 14 to thereby produce a coupling between the drive shaft and the cardanshaft. A coupling box 2 surrounds the drive shaft 1 and houses the coupling sleeve 14 and ball-catch mechanism when the sleeve 14 is fitted onto the end of the drive shaft.

In order to provide driving power to an agricultural implement its input cardanshaft will be coupled with the power output drive shaft of a tractor, which is connected to the implement. This coupling is accomplished by manually pushing the coupling sleeve 14 onto the end of shaft 1. The end of shaft 1 has an annular groove 15, and the ball-catch mechanism includes a plurality of balls 8 which are intended to snap into the groove 15 to provide proper engagement with the shaft 1. The ball-catch mechanism also includes a locking ring 6 movably carried on the coupling sleeve 14 for axial movement between a release position and a locking position in which the ring 6 engages the balls 8 to cause them to be firmly secured in form fitting engagement with the groove 15. A spring 19 acts on the locking ring 6. Locking ring 6 has an annular release face 5 which can be engaged by means for retaining the locking ring in a release position to facilitate coupling and uncoupling with the drive shaft 1. In the embodiment shown in FIG. 1 means for retaining the locking ring 6 in a release position includes a plurality of retaining straps 7 which are evenly spaced about the interior wall of the coupling box 2. The outside of the release face 5 is slightly larger than the diameter of an imaginary circle positioned on the interior of the coupling box and tangent with the inside surface of each of the retaining straps.

In the course of the coupling operation, when the coupling sleeve is pushed onto the end of drive shaft 1, the release face 5 of the locking ring 6 will encounter the retaining straps 7 provided on the interior of the coupling box 2. This will cause the locking ring 6 to be held back by the straps 7 as the coupling sleeve 14 is pushed further onto the shaft 1. As a result, the locking ring 6 is turned or held in its release position so that the locking balls 8 are relatively free for movement in a radially outward direction. With the locking ring 6 in its release position, balls 8 are prevented from dropping out of the ball-catch mechanism by a retaining ring 4 which is secured by a snap ring 3.

As the coupling sleeve 14 is pushed further onto the end of shaft 1 balls 8 will snap into engagement with the annular groove 15. During this further movement onto the shaft 1, release face 5 will overcome the elastic force of the retaining straps 7 so that the locking ring 6 will snap into its locking position under the influence of spring 19 to prevent any further radial movement of the balls 8 in the annular groove 15 thus establishing a positive, form fitting connection between the coupling sleeve 14 and the drive shaft 1.

Both ends of each of the retaining straps 7 are provided with elongated slots or holes to provide means for securing the straps to the walls of the coupling box 2. Accordingly, the straps 7 have a limited degree of mobility determined by the length of the elongated slots so as to have a somewhat elastic effect.

In order to disconnect the quick release coupling between the drive shaft 1 and the coupling sleeve 14, a release lever formed by a disengaging fork 13 is mounted for pivotal movement in the coupling box 2. The fork 13 includes a pair of levers which are mounted on a pivot shaft 9. The ends of the levers are arranged to engage the release face 5 of the locking ring 6 when the pivot shaft 9 is rotated in a clockwise direction when viewing FIG. 1. A release pedal 11 is mounted on an end of the pivot shaft 9. When an appropriate force is applied to the pedal 11, it will cause pivot shaft 9 to rotate and the ends of the levers of the disengaging fork 13 to engage the release face 5 so as to push it over the retaining straps 7 toward the open end of the coupling box 2 causing the locking ring 6 to move to its release position allowing the balls 8 to be radially released from the groove 15. By applying continued pressure to the pedal 11, the levers of the disengaging fork 13 will be further pushed against the face 5 of the locking ring 6 against the force of a return spring 10 thus causing the entire coupling sleeve 14 to be completely pushed off the end of the shaft 1. Thus complete disconnect of the coupling is accomplished. After disconnect and release of pressure on pedal 11, spring 10 will cause fork 13 and pedal 11 to return to its initial position.

FIG. 3 illustrates a further embodiment of the present invention for holding the locking ring 6 in a release position during the insertion and removal of the shaft 1 into and out of the sleeve 14. In this embodiment, the funnel guard 20 which surrounds the universal type joint is provided with an inwardly directly skirt 16 at the open end of the funnel guard. The skirt 16 is provided with a plurality of radial slits 17 to give the skirt a degree of resiliency. The skirt 16 also is provided with a ridge bead or trip edge 18 extending about the inner circumference of the skirt and adapted to engage the release face 5 in order to hold the locking ring 6 in its release position as a result of the inherent pre-applied tension in the skirt 16.

Prior to coupling, the trip edge 18 will engage the face 5 to hold the locking ring 6 in its release position. To accomplish coupling, the coupling sleeve 14 will be pushed onto the end of the drive shaft 1 in the manner previously described. As the coupling sleeve 14 is pushed onto drive shaft 1, the skirt 16 at the end of funnel guard 20 will engage the open end of coupling box 2 surrounding the drive shaft 1. Because of the resiliency of the skirt 16 produced by the slits 17, the inner diameter of the skirt 16 (i.e. the diameter of the trip edge 18) will expand as the coupling sleeve 14 is pushed onto the shaft 1 and as the skirt 16 rides onto the outer wall of the coupling box 2. As a result, face 5 will be released to permit locking ring 6 to snap into its locking position under the influence of spring 19.

Release of the coupling according to the embodiment shown in FIG. 3 is accomplished in a manner similar to that previously described. Application of pressure to pedal 11 will cause the disengaging fork 13 to engage the release face 5 and push the locking ring 6 into its release position thus allowing balls 8 to be released from the groove 15. Further application of pressure to pedal 11 will cause the levers of the disengaging fork 13 to further push against the release face 5 to completely push the coupling sleeve 14 off the end of drive shaft 1. Simultaneously, funnel guard 20 will ride off the coupling box 2 allowing trip edge 18 of the skirt 16 to again engage the release face 5 and hold the locking ring 6 in its release position. The coupling will therefore be in a position ready for the next coupling operation.

While the inventon has been described and illustrated with respect to certain embodiments which produce satisfactory results, it will be appreciated by those skilled in the art, after understanding the purposes of the invention, that various other changes and modifications may be made, without departing from spirit and scope of the invention, and it is therefore intended to cover all such changes and modifications in the appended claims.

What is claimed is:

1. A quick release coupling for connecting a driven cardanshaft having a universal type joint at one end thereof with a drive shaft comprising a coupling box surrounding said drive shaft, a coupling sleeve carried at the end of said driven cardanshaft having said universal joint for axially receiving therein a free end of said drive shaft, an annular groove located on said drive shaft, a ball-catch mechanism carried by said coupling sleeve having a plurality of balls arranged for snap acting cooperative engagement with said annular groove, a locking ring carried for movement on said coupling sleeve between a release position and a locking position for locking said balls in said groove for positive form fitting engagement between said drive shaft and said coupling sleeve, biasing means for urging said locking ring into its locking position, a plurality of resilient retaining straps evenly spaced about the inner circumferential wall of said coupling box, an annular release face on said locking ring having an outside diameter greater than the diameter of a circle formed by points tangent with the inside surfaces of said retaining straps, whereby said locking ring is held in said release position by said retaining straps during insertion and removal of said drive shaft with said coupling sleeve, and a release lever mounted for pivotal movement on said coupling box for engaging said release face to move said locking ring from said locking position to said release position.

2. A quick release coupling for connecting a driven cardanshaft having a universal type joint at one end thereof with a drive shaft comprising a coupling box surrounding said drive shaft, a coupling sleeve carried at the end of said driven cardanshaft having said universal joint for axially receiving therein a free end of said drive shaft, an annular groove located on said drive shaft, a ball-catch mechanism carried by said coupling sleeve having a plurality of balls arranged for snap acting cooperative engagement with said annular groove, a locking ring carried for movement on said coupling sleeve between a release position and a locking position for locking said balls in said groove for positive form fitting engagement between said drive shaft and said driven shaft, biasing means for urging said locking ring into said locking position, a funnel guard surrounding said universal joint opening in a direction toward the end thereof, an inwardly directed elastic skirt having a plurality of radial slits carried at the open end of said funnel guard, a trip edge extending circumferentially about the inner edge of said skirt adapted for engaging an annular face of said locking ring to hold said locking ring in said release position, said skirt being adapted to slide onto and about the outer circumferential wall of said coupling box when said drive shaft is received within said coupling sleeve, and a release lever mounted for pivotal movement on said coupling box for engaging said annular face to move said locking ring from said locking position to said release position.

3. The quick release coupling according to claim 2 wherein said skirt is an inserted plate spring.

4. A quick release coupling for connecting a driven shaft with a drive shaft having a coupling box surrounding said drive shaft, comprising a coupling sleeve carried at one end of said driven shaft adapted for receiving therein an end of said drive shaft, a ball-catch mechanism carried by said coupling sleeve for movement between a release position and a locking position, an annular groove formed on the end of said drive shaft to be fitted with said coupling sleeve, means carried by said ball-catch mechanism for engaging said annular groove for form fitting coupling between said drive shaft and said coupling sleeve, biasing means for urging said ball-catch mechanism into its locking position, means for engaging and retaining said ball-catch mechanism in a release position during insertion and removal of said drive shaft into and out of said coupling sleeve, a release lever pivotally mounted on said coupling box for engaging said ball-catch mechanism to cause movement thereof to a release position thereby permitting quick disengagement of said drive shaft with said coupling sleeve, said ball-catch mechanism comprises a plurality of balls arranged for engagement with said annular groove, a locking ring mounted for axial movement on said coupling sleeve between a release position permitting radial movement of said balls into and out of engagement with said annular groove and a locking position locking said balls into positive engagement with said annular groove, said means for retaining said ball-catch mechanism in its release position comprises a plurality of resilient retaining straps evenly spaced about the inner circumferential wall of said coupling box, said locking ring having an outside diameter greater than the diameter of a circle formed by points tangent with inside surfaces of said retaining straps so that said locking ring is held in its release position by said retaining straps until said sleeve is moved into an axial position on said drive shaft whereby said biasing means causes said locking ring to overcome the engagement with said retaining straps causing it to snap into its locking position.

5. A quick release coupling for connecting a driven shaft with a drive shaft having a coupling box surrounding said drive shaft, comprising a coupling sleeve carried at one end of said driven shaft adapted for receiving therein an end of said drive shaft, a ball-catch mechanism carried by said coupling sleeve for movement between a release position and a locking position, an annular groove formed on the end of said drive shaft to be fitted with said coupling sleeve, means carried by said ball-catch mechanism for engaging said annular groove for form fitting coupling between said drive shaft and said coupling sleeve, biasing means for urging said ball-catch mechanism into its locking position, means for engaging and retaining said ball-catch mechanism in a release position during its insertion and removal of said drive shaft into and out of said coupling sleeve, a release lever pivotally mounted on said coupling box for engaging said ball-catch mechanism to cause movement thereof to a release position thereby permitting quick disengagement of said drive shaft with said coupling sleeve, said ball-catch mechanism comprises a plurality of balls arranged for engagement with said annular groove, a locking ring mounted axial movement on said coupling sleeve between a release position permitting radial movement of said balls into and out of engagement with said annular groove and a locking position locking said balls into positive engagement with said annular groove, said means for retaining said ball-catch mechanism in its release position comprises a funnel guard surrounding the end of said driven shaft to be coupled with said drive shaft, an inwardly directed elastic skirt positioned at the open end of said funnel guard, a trip edge extending circumferentially about the inner edge of said skirt adapted for engaging an annular face of said locking ring to hold said locking ring in said release position, said skirt adapted to slide onto and about the outer circumferential wall of said coupling box when said drive shaft is received within said coupling sleeve to thereby expand the inner diameter of said skirt releasing said locking ring from the release position and allowing it to snap into its locking position under the influence of said biasing means.

6. The quick release coupling according to claim 5 wherein said skirt has a plurality of radially extending slits.

* * * * *